US009643158B2

(12) United States Patent
Ham et al.

(10) Patent No.: US 9,643,158 B2
(45) Date of Patent: May 9, 2017

(54) METAL SUBOXIDE AND METHODS OF PREPARING SAME

(71) Applicant: Samsung Electronics Co., Ltd., Suwon-Si, Gyeonggi-Do (KR)

(72) Inventors: Dong Jin Ham, Anyang-si (KR); Bok Soon Kwon, Seoul (KR); Hyun-seok Kim, Seoul (KR); Joon Seon Jeong, Seoul (KR); Hyo Rang Kang, Anyang-si (KR); Jae Sung Lee, Pohang-si (KR); Sueng Hoon Han, Busan-si (KR); Gang Hong Bae, Jinhae-si (KR)

(73) Assignee: SAMSUNG ELECTRONICS CO., LTD., Kyungsangbuk-Do (KR)

( * ) Notice: Subject to any disclaimer, the term of this patent is extended or adjusted under 35 U.S.C. 154(b) by 205 days.

(21) Appl. No.: 14/573,412

(22) Filed: Dec. 17, 2014

(65) Prior Publication Data

US 2015/0105249 A1   Apr. 16, 2015

Related U.S. Application Data

(62) Division of application No. 13/528,266, filed on Jun. 20, 2012, now Pat. No. 8,927,102.

(30) Foreign Application Priority Data

Feb. 7, 2012 (KR) .................. 10-2012-0012565

(51) Int. Cl.

| | |
|---|---|
| *B01J 21/06* | (2006.01) |
| *C01B 13/18* | (2006.01) |
| *C25B 1/00* | (2006.01) |
| *H01M 4/131* | (2010.01) |
| *H01M 4/485* | (2010.01) |
| *H01M 4/90* | (2006.01) |
| *B82Y 30/00* | (2011.01) |
| *B01J 35/10* | (2006.01) |
| *H01M 4/133* | (2010.01) |
| *H01M 4/36* | (2006.01) |

(52) U.S. Cl.
CPC ......... *B01J 21/063* (2013.01); *B01J 35/1009* (2013.01); *B01J 35/1014* (2013.01); *B82Y 30/00* (2013.01); *C01B 13/18* (2013.01); *C25B 1/003* (2013.01); *H01M 4/131* (2013.01); *H01M 4/485* (2013.01); *H01M 4/9016* (2013.01); *C01P 2002/72* (2013.01); *C01P 2004/03* (2013.01); *C01P 2004/04* (2013.01); *C01P 2004/61* (2013.01); *C01P 2004/62* (2013.01); *C01P 2004/64* (2013.01); *C01P 2006/12* (2013.01); *H01M 4/133* (2013.01); *H01M 4/362* (2013.01); *Y02P 70/54* (2015.11); *Y10T 428/2982* (2015.01)

(58) Field of Classification Search
CPC ........ C25B 1/003; C01B 13/18; B01J 21/063; B01J 35/1009; B01J 35/1014; H01M 4/131; H01M 4/485; H01M 4/9016; Y10T 428/2982
USPC ....................................................... 428/402
See application file for complete search history.

(56) References Cited

U.S. PATENT DOCUMENTS

| | | | | |
|---|---|---|---|---|
| 8,012,451 | B2* | 9/2011 | Kobasa | .................. B01J 21/063 423/608 |
| 8,177,901 | B2 | 5/2012 | Bujard et al. | |
| 8,377,342 | B2* | 2/2013 | Ellis | ..................... C01G 23/043 148/421 |
| 8,927,102 | B2* | 1/2015 | Ham | ...................... C25B 1/003 252/520.2 |
| 2008/0253958 | A1* | 10/2008 | McCracken | ......... C01G 23/043 423/609 |
| 2009/0244813 | A1* | 10/2009 | Reed | ...................... C01G 33/00 361/528 |
| 2010/0285955 | A1 | 11/2010 | Kobasa et al. | |
| 2011/0123867 | A1 | 5/2011 | Ellis et al. | |

FOREIGN PATENT DOCUMENTS

| | | |
|---|---|---|
| JP | 2849779 B2 | 11/1998 |
| KR | 20010025629 A | 4/2001 |
| KR | 2010-0061500 A | 6/2010 |

OTHER PUBLICATIONS

Ioroi, T. et al., "Sub-stoichiometric titanium oxide-supported platinum electrocatalyst for polymer electrolyte fuel cells", Electrochem. Commun. 7, 2005, pp. 183-188.
Han, W. Q. and Zhang, Y., "Magnéli phases $TinO_{2n-1}$ nanowires: Formation, optical, and transport properties", Appl. Phys. Lett., 92, 203117, 2008.
Toyoda, M., et al., "Preparation of carbon-coated Magneli phases $TinO_{2n-1}$ and their photocatalytic activity under visible light", Applied Catalysis B: Environmental, 88, 2009, pp. 160-164.
Han, W., "Black Conductive Titanium Oxide High-Capacity Materials for Battery Electrodes", Brookhaven National Laboratory, BNL-95136-2011-CP, Presented at the Technolgy Ventures Corporation Equity Capital Summit, May 2011.
Ohkoshii, S. I., et al., "Synthesis of a metal oxide with a room-temperature photoreversible phase transition", Nature Chemistry, vol. 2, Jul. 2010, pp. 539-545.
Rezan, S. A., et al., "Carbothermal Reduction and Nitridation of Titanium Dioxide in a $H_2$-$N_2$ Gas Mixture", J. Am. Ceram. Soc., 94, 2011, pp. 3804-3811.
Ganesan, R. and Lee, J. S., "Tungsten Carbide Microspheres as a Noble-Metal-Economic Electrocatalyst for Methanol Oxidation", Angew. Chem. Int. Ed., 44, 2005, pp. 6557-6560.

(Continued)

*Primary Examiner* — Leszek Kiliman
(74) *Attorney, Agent, or Firm* — Harness, Dickey & Pierce, P.L.C.

(57) ABSTRACT

A metal suboxide having a specific surface area of greater than or equal to about 1.5 $m^2/g$ is prepared by preparing a metal suboxide precursor, and heat-treating the metal suboxide precursor.

12 Claims, 18 Drawing Sheets

(56) References Cited

OTHER PUBLICATIONS

Lee, J., et al., "Synthesis of new nanoporous carbon materials using nanostructured silica materials as templates", J. Mater. Chem., 14, 2004, pp. 478-486.
Al-Muhtaseb, S. A. and Ritter, J. R., "Preparation and Properties of Resorcinol-Formaldehyde Organic and Carbon Gels", Adv. Mater., 15, 2003, pp. 101-114.
Smith, J. R. et al., "Electrodes based on Magnéli phase titanium oxides: the properties and applications of Ebonex® materials", J. Appl. Electroch., 28, 1998, pp. 1021-1033.
Ham, D. J., et al., "Palladium-nickel alloys loaded on tungsten carbide as platium-free anode electrocatalysts for polymer electrolyte membrane fuel cells", Chem. Commun. 47, 2011, pp. 5792-5794.

\* cited by examiner

METAL SUBOXIDE AND METHODS OF PREPARING SAME

CROSS-REFERENCE TO RELATED APPLICATION

This application is a divisional application of U.S. application Ser. No. 13/528,236, filed on Jun. 20, 2012, now U.S. Pat. No. 8,927,102, which claims priority to and the benefit of Korean Patent Application No. 10-2012-0012565 filed in the Korean Intellectual Property Office on Feb. 7, 2012, the entire contents of each of which are incorporated herein by reference.

BACKGROUND

1. Field

A metal suboxide and methods of preparing the same are disclosed.

2. Description of the Related Art

Recently, as electrochemical devices are increasingly demanded in energy and environment fields, the electrochemical devices have required more efficiency. In order to improve efficiency of an electrochemical device, a material having excellent conductivity and durability as a photocatalyst has been researched.

SUMMARY

A metal suboxide and methods of preparing the same are disclosed.

In accordance with an example embodiment, there is provided a metal suboxide having a high specific surface area.

In accordance with another example embodiment, there is provided a catalyst or an electrochemical device including the metal suboxide.

In accordance with yet another example embodiment, there is provided a method of preparing the metal suboxide.

According to one example embodiment, a metal suboxide having a specific surface area of greater than or equal to about 1.5 $m^2/g$ is provided.

The specific surface area of the metal suboxide may range from about 1.5 $m^2/g$ to about 50 $m^2/g$.

The metal suboxide may include carbon in an amount of less than, or equal to, about 1 wt % based on a total weight of the metal suboxide.

The metal suboxide may include one metal selected from a transition metal, a post-transition metal, and a combination thereof.

In one example embodiment, the metal suboxide may include one metal selected from titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), aluminum (Al), gallium (Ga), indium (In), thallium (Tl), tin (Sn), lead (Pb), bismuth (Bi), and a combination thereof.

The metal suboxide may be a titanium suboxide, wherein titanium in the titanium suboxide may have an oxidation number of about +2 to about +3.9.

The metal suboxide may include a pore.

According to another example embodiment, a catalyst including the metal suboxide is provided.

According to yet another example embodiment, an electrochemical device including the metal suboxide is provided.

According to still another example embodiment, provided is a method of preparing a metal suboxide that includes preparing a mixture including a metal suboxide precursor, an aromatic compound substituted with a hydroxy group, and a linking precursor including one selected from a C1 to C30 aldehyde, a C3 to C30 ketone, and a combination thereof; reacting the aromatic compound substituted with a hydroxy group with the linking precursor to form a polymer on the surface of the metal suboxide precursor; performing a heat treatment; and removing carbon.

The metal suboxide precursor may include one selected from a metal sulfate, a metal halide, a metal alkoxide, and a combination thereof.

The metal suboxide precursor may have an average particle diameter of about 1 Å to about 1000 Å.

The aromatic compound substituted with a hydroxy group may include one selected from phenol, dihydroxy benzene, trihydroxybenzene, hydroxy naphthalene, dihydroxy naphthalene, trihydroxy naphthalene, hydroxy anthracene, dihydroxy anthracene, trihydroxy anthracene, hydroxy phenanthrene, dihydroxy phenanthrene, trihydroxy phenanthrene, hydroxy thiophene, dihydroxy thiophene, trihydroxy thiophene, hydroxy furan, dihydroxy furan, trihydroxy furan, hydroxy pyrrole, dihydroxy pyrrole, trihydroxy pyrrole, and a combination thereof.

The linking precursor may include one selected from formaldehyde, acetaldehyde, propionaldehyde, acetone, methylethyl ketone, diethyl ketone, and a combination thereof.

The mixture may be prepared using at least one solvent selected from water, aromatic hydrocarbons, saturated hydrocarbons, halogenated saturated hydrocarbons, aldehydes, alcohols, ethers, carboxylic acids, esters, ketones, and nitriles.

The heat treatment may be performed at a temperature of about 800° C. to about 1500° C.

The carbon may be amorphous carbon.

The mixture may further include a pore-forming agent. The pore-forming agent may include one selected from silica, alumina, opal, a metal particle, a surfactant, a polymer, and a combination thereof. The pore-forming agent may have an average particle diameter of about 0.1 nm to about 100 nm.

The method of preparing metal suboxide may further include removing the pore-forming agent after the process of removing the carbon.

According to another example embodiment, a method of preparing a metal suboxide that includes preparing a metal suboxide precursor and heat-treating the metal suboxide precursor is provided.

BRIEF DESCRIPTION OF THE DRAWINGS

Example embodiments will be more clearly understood from the following detailed description taken in conjunction with the accompanying drawings. FIGS. 1-11 represent non-limiting, example embodiments as described herein.

FIG. 3 shows X-ray diffraction analysis data of the metal suboxides according to Examples 1 to 4.

FIG. 4 is a SEM (scanning electron microscope) photograph of the metal suboxide according to Example 1.

FIG. 5 is a SEM photograph of the metal suboxide according to Example 2.

FIG. 6 is a SEM photograph of the metal suboxide according to Example 3.

FIG. 7 is a SEM photograph of the metal suboxide according to Example 4.

FIG. 8 is a HRTEM (high resolution transmission electron microscope) photograph of the metal suboxide according to Example 1.

FIG. 9 is a HRTEM photograph of the metal suboxide according to Example 2.

FIG. 10 is a HRTEM photograph of the metal suboxide according to Example 3.

FIG. 11 is a HRTEM photograph of the metal suboxide according to Example 4.

DETAILED DESCRIPTION

Figure 1A:
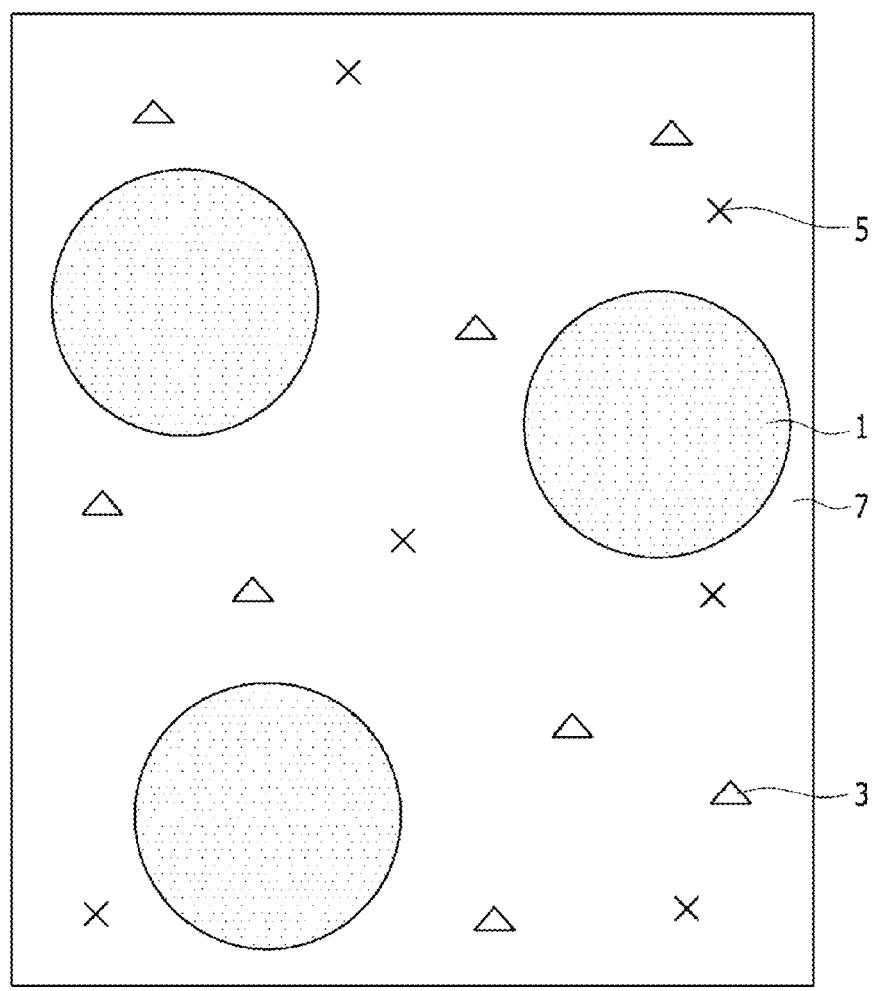
FIGS. 1A to 1D are schematic views sequentially showing a method of preparing a metal suboxide according to one example embodiment.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various aspects will be described in detail with reference to the attached drawings. However, the present invention is not limited to example embodiments described.

A metal suboxide and methods of preparing the same are disclosed.

As used herein, when a definition is not otherwise provided, the term "aldehyde" may refer to a C1 to C30 aldehyde, for example a C1 to C20 aldehyde or a C1 to C10 aldehyde, the term "ketone" may refer to a C3 to C30 ketone, for example a C3 to C20 ketone or a C3 to C10 ketone, the term "alcohol" may refer to a C1 to C30 alcohol, for example a C1 to C20 alcohol or a C1 to C10 alcohol, the term "ether" may refer to a C2 to C30 ether, a C2 to C20 ether, or a C2 to C10 ether, the term "carboxylic acid" may refer to a C1 to C30 carboxylic acid, for example a C1 to C20 carboxylic acid or a C1 to C10 carboxylic acid, the term "ester" may refer to a C2 to C30 ester, for example a C2 to C20 ester or C2 to C10 ester, and the term "nitrile" may refer to a C1 to C30 nitrile, for example a C1 to C20 nitrile or a C1 to C10 nitrile.

As used herein, when a definition is not otherwise provided, the term "aromatic" may refer to a C6 to C30 aryl or a C2 to C30 heteroaryl, for example a C6 to C20 aryl or a C2 to C20 heteroaryl, or a C6 to C12 aryl or a C2 to C12 heteroaryl. As used herein, when a definition is not otherwise provided, the term "hetero" may refer to one including 1 to 3 heteroatoms selected from O, S, N, P, Si, and a combination thereof in a ring. The aryl and heteroaryl may be present singularly or two or more aryls or heteroaryls may be fused to form a condensed cycle.

As used herein, when a definition is not otherwise provided, the term "combination" may refer to a mixture or an alloy.

In this disclosure "*" denotes the same or different atom or a part connected to a chemical formula.

The metal suboxide according to one example embodiment has a specific surface area of greater than, or equal to, about 1.5 m²/g. Herein, the metal suboxide as a catalyst (e.g., an electrochemical catalyst) has a larger reaction area and thus higher catalytic activity and electrochemical activity than a catalyst having a smaller specific surface area. In one example embodiment, the metal suboxide may have a specific surface area ranging from about 1.5 m²/g to about 50 m²/g, and more specifically, from about 2.5 m²/g to about 50 m²/g.

The metal suboxide may be a single kind of metal suboxide, in particular, a metal suboxide having a single composition or two or more kinds of metal suboxides. In addition, when the metal suboxide has two or more kinds of metal suboxides, the metal suboxides may be a mixture type, a core-shell type, and a combination thereof, but is not limited thereto.

The metal suboxide may include carbon in an amount of less than, or equal to, about 1 wt %, specifically less than, or equal to, about 0.9 wt %, and more specifically less than, or equal to, about 0.5 wt % based on the total weight of the metal suboxide. When the metal suboxide includes carbon within the range, the metal suboxide may have the above specific surface area without affecting properties of the metal suboxide, and has more exposed surfaces and thus has optimal catalytic activity and electrochemical activity.

In the metal suboxide, the metal may include one selected from a transition metal, a post-transition metal, and a combination thereof.

In one example embodiment, the metal may include one selected from a Group 4 element, a Group 5 element, a Group 6 element, a Group 13 element, a Group 14 Group element, a Group 15 element, and a combination thereof, but is not limited thereto.

In another example embodiment, the metal may include one selected from titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), aluminum (Al), gallium (Ga), indium (In), thallium (Tl), and a combination thereof, but is not limited thereto.

For example, the metal suboxide may be a titanium suboxide, wherein the titanium may have an oxidation number of about +2 to about +3.9. When the titanium has an oxidation number within the range, the metal suboxide may have high electrical conductivity according to characteristics of each metal suboxide and effectively control bandgap thereof. In another example embodiment, the titanium may have an oxidation number of about +3 to about +3.8.

The titanium suboxide may be a compound represented by the Chemical Formula 1.

$$Ti_nO_{2n-1}$$ Chemical Formula 1

In Chemical Formula 1, n is an integer ranging from 3 to 12, specifically 3 to 8, more specifically 3 to 5, and even more specifically 3 or 4.

The metal suboxide may have an average particle diameter of about 20 nm to about 10 μm. When the metal suboxide has an average particle diameter within the range, the specific surface area of the metal suboxide may be effectively increased. In one example embodiment, the metal suboxide may have an average particle diameter of about 50 nm to about 5 μm.

The metal suboxide may include a pore. When the metal suboxide has a pore, the metal suboxide may have a larger specific surface area and may have effectively improved catalytic activity and electrochemical activity of a catalyst (e.g., an electrochemical catalyst).

The pore may have an average diameter of about 0.1 nm to about 200 nm. When the pore has an average diameter within the range, the specific surface area of the metal suboxide and reaction points in a catalytic reaction and an electrochemical reaction may be increased. In one example embodiment, the pore may have an average diameter of about 0.5 nm to about 100 nm.

According to another example embodiment, a catalyst including the metal suboxide is provided.

The catalyst includes the metal suboxide and thus may have a large specific surface area and provide more reaction points in a catalyst reaction (e.g., an electrochemical catalyst reaction). In addition, the oxidation number of a metal (e.g., titanium) may be easily adjusted to have appropriate reaction characteristics. Accordingly, this catalyst may be used as a photocatalyst in a photoelectrochemical cell and be effectively applied in photoelectrochemical water decomposition and solar fuel production, an anode/cathode support for a polymer electrolyte fuel cell, and an electrode active material for a rechargeable lithium battery. When the catalyst is used as a photocatalyst in a photoelectrochemical cell, it may adjust the bandgap of a photoactive layer and thus improve photoactive efficiency.

According to yet another example embodiment, an electrochemical device including the metal suboxide is provided. In one example embodiment, the electrochemical device may be a photoelectrochemical cell, a hydrolysis device, a fuel cell, a rechargeable lithium battery, a zinc-air battery, and the like. The metal suboxide may be used as an electrode material or a photocatalyst in the electrochemical device, but is not limited thereto.

Some parts of the metal suboxides may have excellent electrical conductivity and anti-oxidation effects and may be effectively used as an electrode material for a hydrolysis device, a fuel cell, a rechargeable lithium battery, a zinc-air battery, and the like, while other parts of the metal suboxides may adjust a bandgap and decompose a contamination material and thus be used as a photocatalyst in a photoelectrochemical cell and improve photoactive efficiency.

According to still another example embodiment, a method of preparing a metal suboxide includes preparing a mixture including a metal suboxide precursor, an aromatic compound substituted with a hydroxy group, and a linking precursor including one selected from a C1 to C30 aldehyde, a C3 to C30 ketone, and a combination thereof; reacting the aromatic compound substituted with a hydroxy group with the linking precursor to form a polymer on the surface of the metal suboxide precursor; performing a heat treatment; and removing carbon.

The mixture may be prepared as a solution using a solvent. However, the mixture is not limited thereto, and may not include a solvent.

Hereinafter, a method of preparing the metal suboxide according to one example embodiment will be illustrated referring to FIGS. 1A to 1D.

FIGS. 1A to 1D are schematic views sequentially showing a method of a metal suboxide according to one example embodiment.

First, referring to FIG. 1A, a metal suboxide precursor 1, an aromatic compound substituted with a hydroxy group 3, a linking precursor 5 including one selected from a C1 to C30 aldehyde, a C3 to C30 ketone, and a combination thereof, and a solvent 7 are mixed.

The metal suboxide precursor 1 may include one selected from a metal sulfate; a metal halide; a metal alkoxide (e.g., a metal isopropoxide, a metal butoxide, and the like) and a combination thereof, but is not limited thereto.

In one example embodiment, the metal suboxide precursor 1 may include one selected from $Ti(SO_4)_2$, $Ti_2(SO_4)_3$, $Ti_2(SO_2)_3$, $TiCl_4$, $TiCl_3$, $Ti(OCH(CH_3)_2)_4$, $Ti(OBu)_4$, and a combination thereof, but is not limited thereto.

According to one example embodiment, the titanium suboxide precursor may be a solution precursor having an oxidation number of greater than, or equal to, about +3. Herein, the titanium suboxide precursor may directly participate in a polymer polymerization reaction and may be easily mixed in a solution without an additional process.

The metal suboxide precursor 1 may have an average particle diameter of about 1 Å to about 1000 Å. When the metal suboxide precursor 1 has an average particle diameter within the range, it may have a small particle diameter and effectively has a small size. In one example embodiment, the metal suboxide precursor 1 may have an average particle diameter of about 1 Å to about 500 Å, specifically about 1 Å to about 100 Å.

The aromatic compound substituted with a hydroxy group 3 may include one selected from phenol, dihydroxy benzene, trihydroxybenzene, hydroxy naphthalene, dihydroxy naphthalene, trihydroxy naphthalene, hydroxy anthracene, dihydroxy anthracene, trihydroxy anthracene, hydroxy phenanthrene, dihydroxy phenanthrene, trihydroxy phenanthrene, hydroxy thiophene, dihydroxy thiophene, trihydroxy thiophene, hydroxy furan, dihydroxy furan, trihydroxy furan, hydroxy pyrrole, dihydroxy pyrrole, trihydroxy pyrrole, and a combination thereof, but is not limited thereto.

In one example embodiment, the aromatic compound substituted with a hydroxy group 3 may include one selected from phenol, resorcinol, phloroglucinol, and a combination thereof, but is not limited thereto.

In one example embodiment, the linking precursor may include one selected from a C1 to C20 aldehyde, a C3 to C20 ketone, and a combination thereof, and in another example embodiment, the linking precursor may include one selected from a C1 to C10 aldehyde, a C3 to C10 ketone, and a combination thereof, but is not limited thereto.

In another example embodiment, the linking precursor may include one selected from formaldehyde, acetaldehyde, propionaldehyde, acetone, methylethyl ketone, diethyl ketone, and a combination thereof, but is not limited thereto.

In one example embodiment, the solvent 7 may include one selected from water; aromatic hydrocarbons (e.g., toluene, benzene, and the like); saturated hydrocarbons (e.g., pentane, hexane, and the like); halgenated saturated hydrocarbons (e.g., chloroform, dichloromethane, carbon tetrachloride, methylene chloride, and the like); aldehydes (e.g., dimethylformaldehyde and the like); alcohols (e.g., methanol, ethanol, propanol, and the like); ethers (e.g., diethyl ether, dioxane, tetrahydrofuran, and the like); carboxylic acids (e.g., acetic acid and the like); esters (e.g., methyl acetate, ethyl acetate, butyl acetate, and the like); ketones (e.g., acetone, 1-hexanone, and the like); nitriles (e.g., acetonitrile and the like); and a combination thereof, but is not limited thereto.

The mixture may include about 0.1 wt % to about 50 wt % of the metal suboxide precursor 1, about 0.01 wt % to about 10 wt % of the aromatic compound substituted with a hydroxy group 3, about 0.01 wt % to about 10 wt % of the linking precursor 5, and about 30 wt % to about 99.88 wt % of the solvent 7 based on the total amount of the mixture. When each component is included within the range, the metal suboxide precursor is uniformly polymerized with a polymer. In one example embodiment, the mixture may include about 0.5 wt % to about 10 wt % of the metal suboxide precursor 1, about 0.01 wt % to about 1 wt % of the aromatic compound substituted with a hydroxy group 3, about 0.01 wt % to about 1 wt % of the linking precursor 5, and about 88 wt % to about 99.48 wt % of the solvent 7 based on the total amount of the mixture. In another example embodiment, the mixture may include about 1 wt % to about 5 wt % of the metal suboxide precursor 1, about 0.1 wt % to about 0.8 wt % of the aromatic compound substituted with a hydroxy group 3, about 0.1 wt % to about 0.8 wt % of the linking precursor 5, and about 93.4 wt % to about 98.8 wt % of the solvent 7 based on the total amount of the mixture.

Figure 1B:
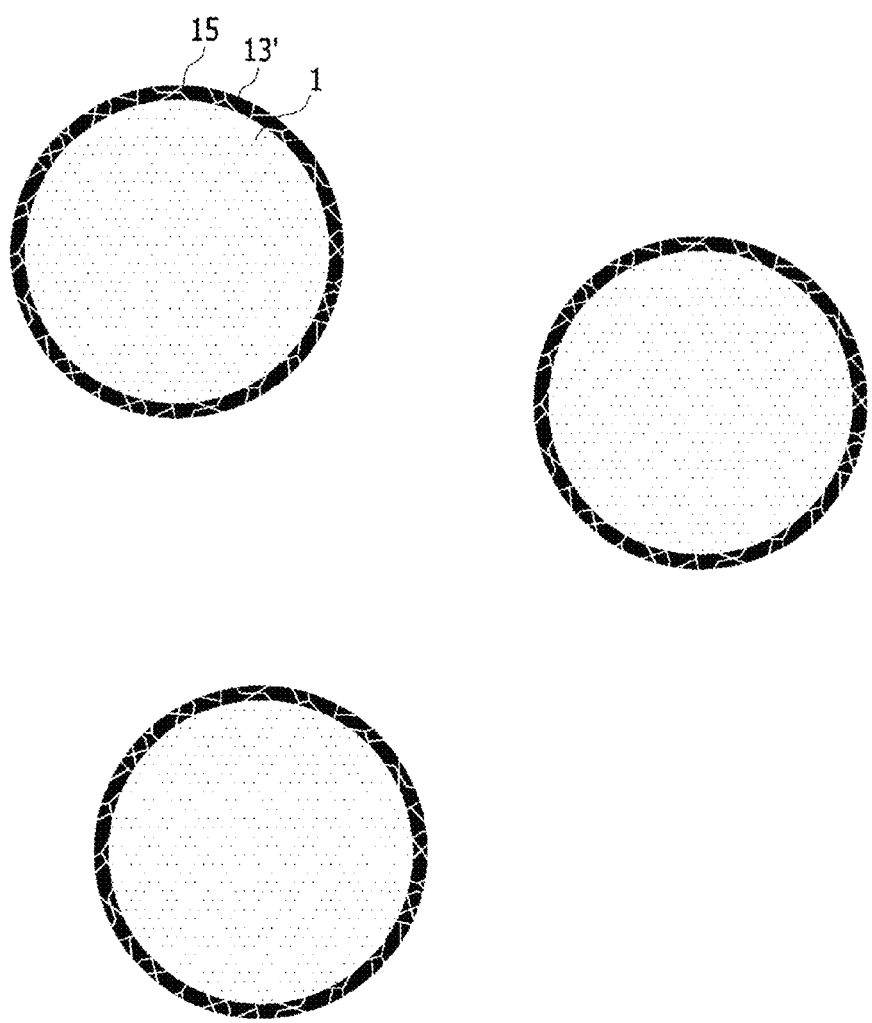

Referring to FIG. 1B, the aromatic compound substituted with a hydroxy group and the linking precursor are reacted and form a polymer 13' on the surface of the metal suboxide precursor 1 in the mixture.

For example, when the mixture is refluxed at about 50° C. to about 95° C. for about 6 hours to about 48 hours, the aromatic compound substituted with a hydroxy group reacts with the linking precursor and is polymerized therewith, forming a polymer 13' on the surface of the metal suboxide precursor 1. However, the polymer formation is not limited thereto, and may be performed in various methods.

For example, when the aromatic compound substituted with a hydroxy group is resorcinol, and the linking precursor is formaldehyde, a resorcinol-formaldehyde-based polymer may be produced according to the following Reaction Scheme 1.

Reaction Scheme 1

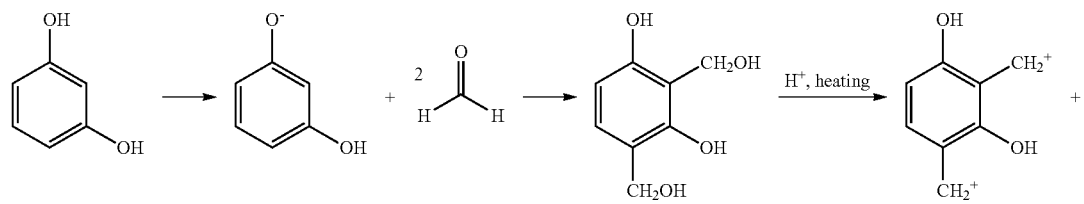

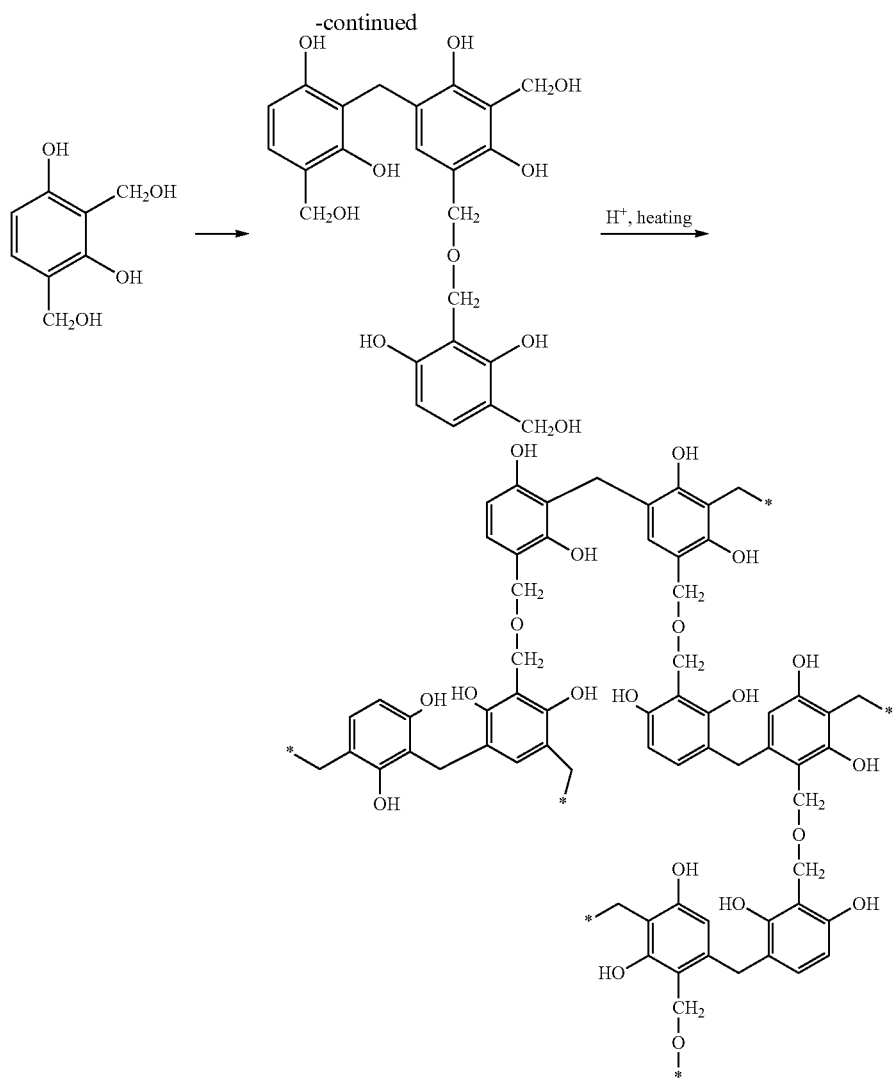

The polymer 13' surrounds the surface of the metal suboxide precursor 1, and a gas passage 15, through which a gas (e.g., hydrogen ($H_2$)) and the like passes, is formed among the polymer 13'.

Then, the reactant may be filtered and dried, but is not limited thereto, and the filtering and drying processes may be selectively omitted.

Figure 1C:
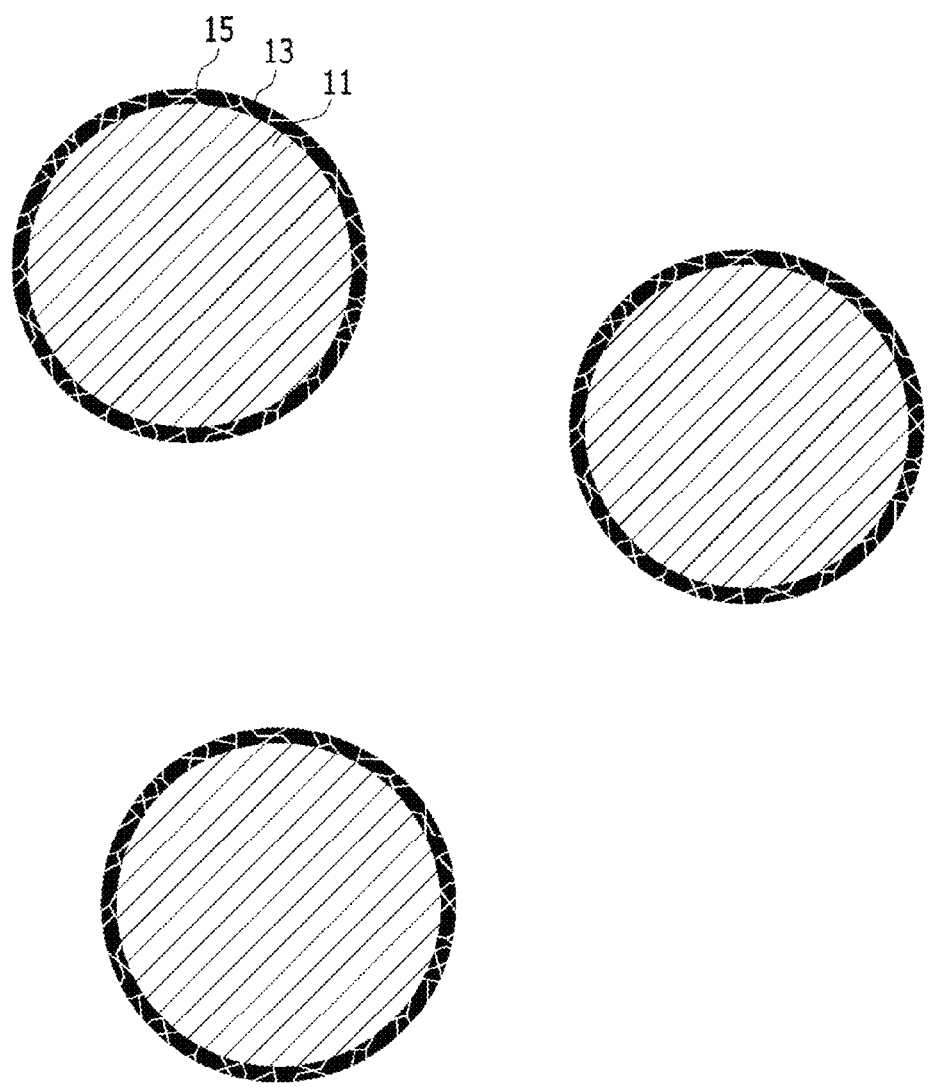

Referring to FIG. 1C, the metal suboxide precursor surrounded by the polymer is heat-treated.

The heat treatment may transform the metal suboxide precursor into a metal suboxide 11. The polymer is decomposed and turned into carbon 13, for example, amorphous carbon.

The polymer or the carbon surrounds the surface of the metal suboxide precursor or the metal suboxide, and may play a role of a capping agent preventing, or suppressing, sintering of the metal suboxide precursors or the metal suboxides. In this way, the metal suboxide may be adjusted regarding particle diameter and to have a larger specific surface area.

On the other hand, the gas passage 15, through which a gas (e.g., hydrogen ($H_2$) and the like) passes, is formed among the polymer or the carbon, and controls a diffusion pathway for gas (and, thus, a reduction degree of the metal suboxide precursor), forming a metal suboxide having a desired composition and lattice property and a particular phase.

The heat treatment may be performed at a temperature ranging from about 800° C. to about 1500° C., and is controlled to regulate composition and lattice properties of a produced metal suboxide. In one example embodiment, the heat treatment may be performed at a temperature ranging from about 900° C. to about 1500° C.

The heat treatment may be performed under an argon (Ar) atmosphere, a hydrogen ($H_2$) atmosphere, a nitrogen atmosphere, a methane atmosphere, an ammonia atmosphere, and the like, which may be combined and sequentially provided.

In one example embodiment, the heat treatment may be performed under an argon (Ar) atmosphere at a temperature ranging from about 900° C. to about 1500° C. for about 1 hour to about 12 hours, and then under a hydrogen ($H_2$) atmosphere at a temperature ranging from about 900° C. to about 1500° C. for about 1 hour to about 12 hours. When the heat treatment is performed within the temperature and time range, a metal suboxide may be appropriately adjusted regarding to composition and lattice properties.

Figure 1D:
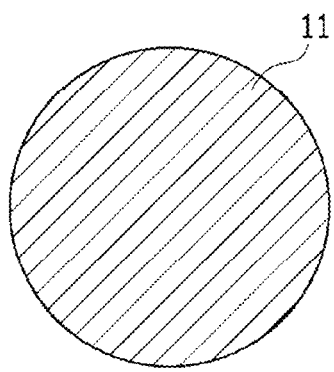
Figure 1D:
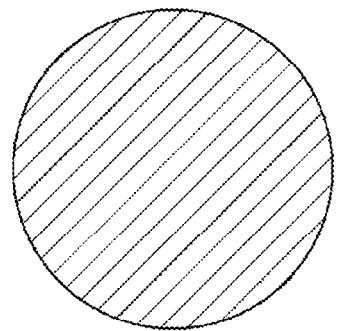
Figure 1D:
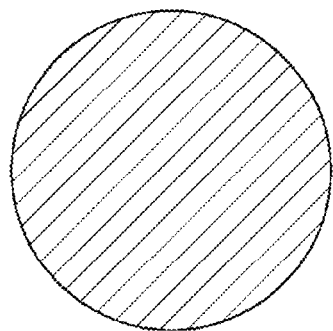

Referring to FIG. 1D, carbon on the surface of a metal suboxide 11 is removed.

For example, a metal suboxide 11 is treated to remove carbon on the surface using a sodium hypochlorite (NaOCl) solution, in particular, a sodium hypochlorite (NaOCl) solution including about 10 wt % to about 15 wt % of chlorine. However, the carbon removal is not limited thereto, and may be performed in various methods.

A method of preparing a metal suboxide according to another example embodiment includes preparing a mixture including a metal suboxide precursor, an aromatic compound substituted with a hydroxy group, a linking precursor including one selected from a C1 to C30 aldehyde, a C3 to C30 ketone, and a combination thereof, and a pore-forming agent; reacting the aromatic compound substituted with a hydroxy group with the linking precursor to form a polymer on the surface of the metal suboxide precursor; performing heat treatment; removing carbon; and removing the pore-forming agent.

The mixture may be prepared as a solution by using a solvent. However, the mixture is not limited thereto, and may not use a solvent.

Hereinafter, a method of preparing the metal suboxide according to one example embodiment will be illustrated referring to FIGS. 2A to 2E.

FIGS. 2A to 2E are schematic diagrams sequentially showing a method of preparing a metal suboxide according to one example embodiment.

Figure 2A:
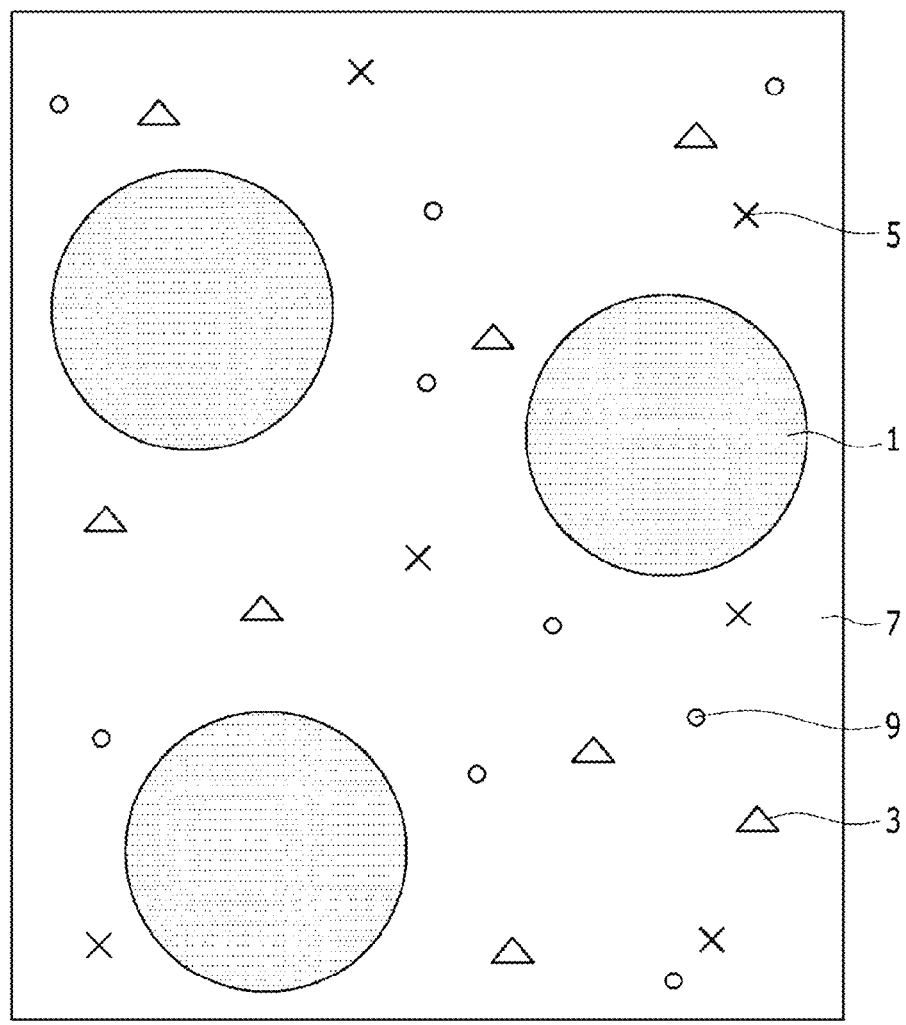
FIGS. 2A to 2E are schematic views sequentially showing a method of preparing a metal suboxide according to another example embodiment.

Referring to FIG. 2A, a metal suboxide precursor 1, an aromatic compound substituted with a hydroxy group 3, a linking precursor 5 including one selected from a C1 to C30 aldehyde, a C3 to C30 ketone, and a combination thereof, a pore-forming agent 9, and a solvent 7 are mixed.

The metal suboxide precursor, aromatic compound substituted with a hydroxy group, linking precursor, and solvent are the same as above unless there is a particular mention to the contrary.

The pore-forming agent 9 may include one selected from silica, alumina, opal, a metal particle, a surfactant, a polymer material, and a combination thereof, but is not limited thereto. In one example embodiment, the metal particle may be selected from iron (Fe), cobalt (Co), nickel (Ni), copper (Cu), zinc (Zn), niobium (Nb), molybdenum (Mo), ruthenium (Ru), rhodium (Rh), palladium (Pd), silver (Ag), cadmium (Cd), tungsten (W), osmium (Os), iridium (Ir), platinum (Pt), gold (Au), and a combination thereof, the surfactant may be selected from cetyltrimethyl ammonium bromide, sodium dodecyl sulfate, and a combination thereof, and the polymer material may be selected from polystyrene, polyethylene, polyester, polypropylene, polyamide, polyimide, polycarbonate, polyethylene glycol, and a combination thereof, but they are not limited thereto.

The pore-forming agent 9 may have an average particle diameter of about 0.1 nm to about 100 nm. When the pore-forming agent 9 has an average particle diameter within the range, it may effectively form a pore with an appropriate size to increase the specific surface area of a metal suboxide. In one example embodiment, the pore-forming agent 9 may have an average particle diameter of about 2 nm to about 50 nm.

The mixture may include about 0.1 wt % to about 50 wt % of the metal suboxide precursor 1, about 0.01 wt % to about 10 wt % of the aromatic compound substituted with a hydroxy group 3, about 0.01 wt % to about 10 wt % of the linking precursor 5, about 1 wt % to about 50 wt % of the pore-forming agent 9, and about 0 wt % to about 98.88 wt % of the solvent 7 based on the total amount of the mixture. When the components are included within the range, the metal suboxide precursor and the pore-forming agent may be uniformly polymerized with a polymer. In one example embodiment, the mixture may include about 0.5 wt % to about 10 wt % of the metal suboxide precursor 1, about 0.01 wt % to about 1 wt % of the aromatic compound substituted with a hydroxy group 3, about 0.01 wt % to about 1 wt % of the linking precursor 5, about 1 wt % to about 50 wt % of the pore-forming agent 9, and about 38 wt % to about 98.48 wt % of the solvent 7 based on the total amount of the mixture. In another example embodiment, the mixture may include about 1 wt % to about 5 wt % of the metal suboxide precursor 1, about 0.1 wt % to about 0.8 wt % of the aromatic compound substituted with a hydroxy group 3, about 0.1 wt % to about 0.8 wt % of the linking precursor 5, about 5 wt % to about 30 wt % of the pore-forming agent 9, and about 63.4 wt % to about 93.8 wt % of the solvent 7 based on the total weight of the mixture.

Figure 2B:
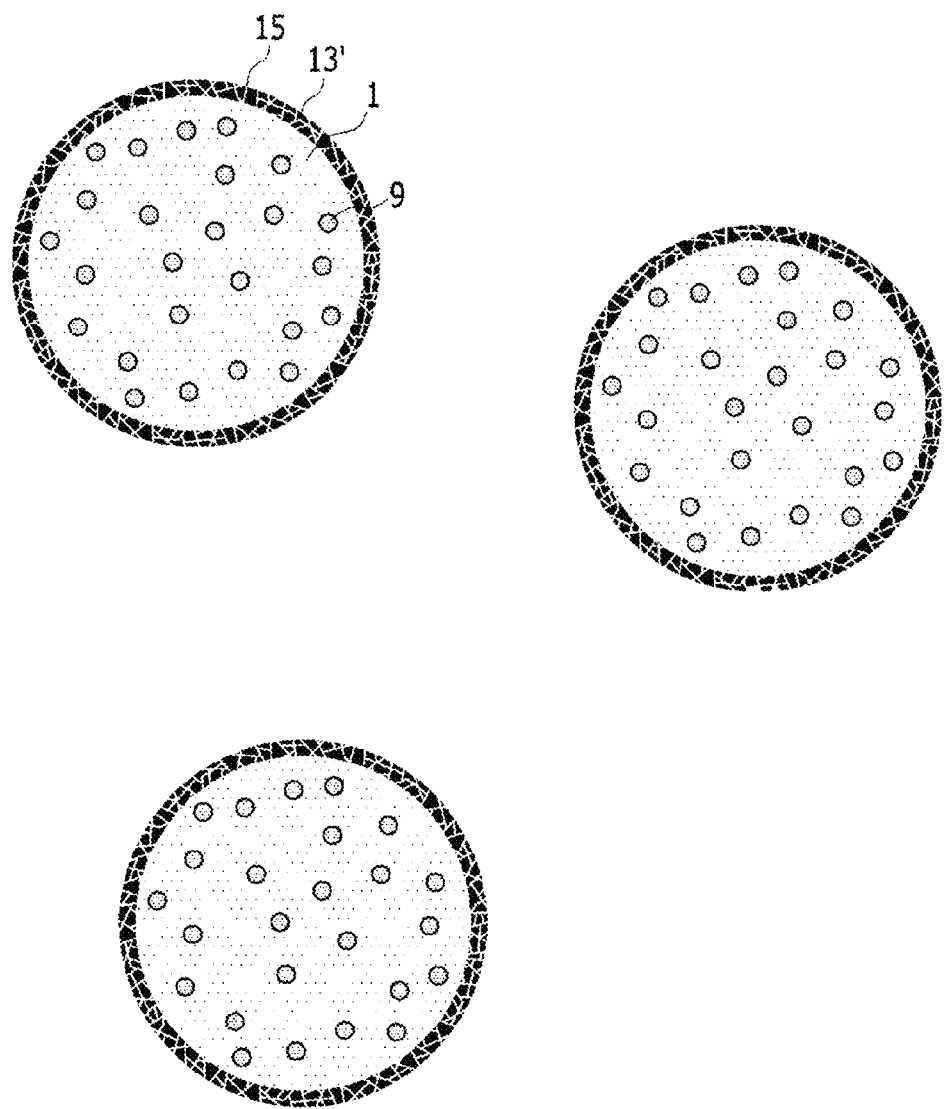

Referring to FIG. 2B, the aromatic compound substituted with a hydroxy group and the linking precursor in the mixture are reacted together and form a polymer 13' on the surface of the metal suboxide precursor 1.

The reaction of the aromatic compound substituted with a hydroxy group, the linking precursor and its result, and the polymer are the same as described above, unless there is a particular mention to the contrary.

Herein, the pore-forming agent 9 may be included inside the metal suboxide precursor 1. However, the pore-forming agent 9 is not limited thereto, and may be included among the polymer 13'. Herein, the interaction between the pore-forming agent 9 and the polymer 13' may be larger than the interaction between the metal suboxide precursor 1 and the polymer 13'. Resultantly, more gas passages 15 among the polymer 13', through which gases (e.g., hydrogen ($H_2$) and the like) pass, may be formed when a pore-forming agent is used than when not used.

The gas passage 15 formed among the polymers 13', through which gases (e.g., hydrogen ($H_2$)) pass, may be regulated to control a diffusion pathway for gas and thus a reduction degree of the metal suboxide precursor 1, forming a metal suboxide having a desired composition.

Resultantly, a metal suboxide precursor 1 includes a pore-forming agent 9 thereinside and is surrounded with a polymer 13'.

Figure 2C:
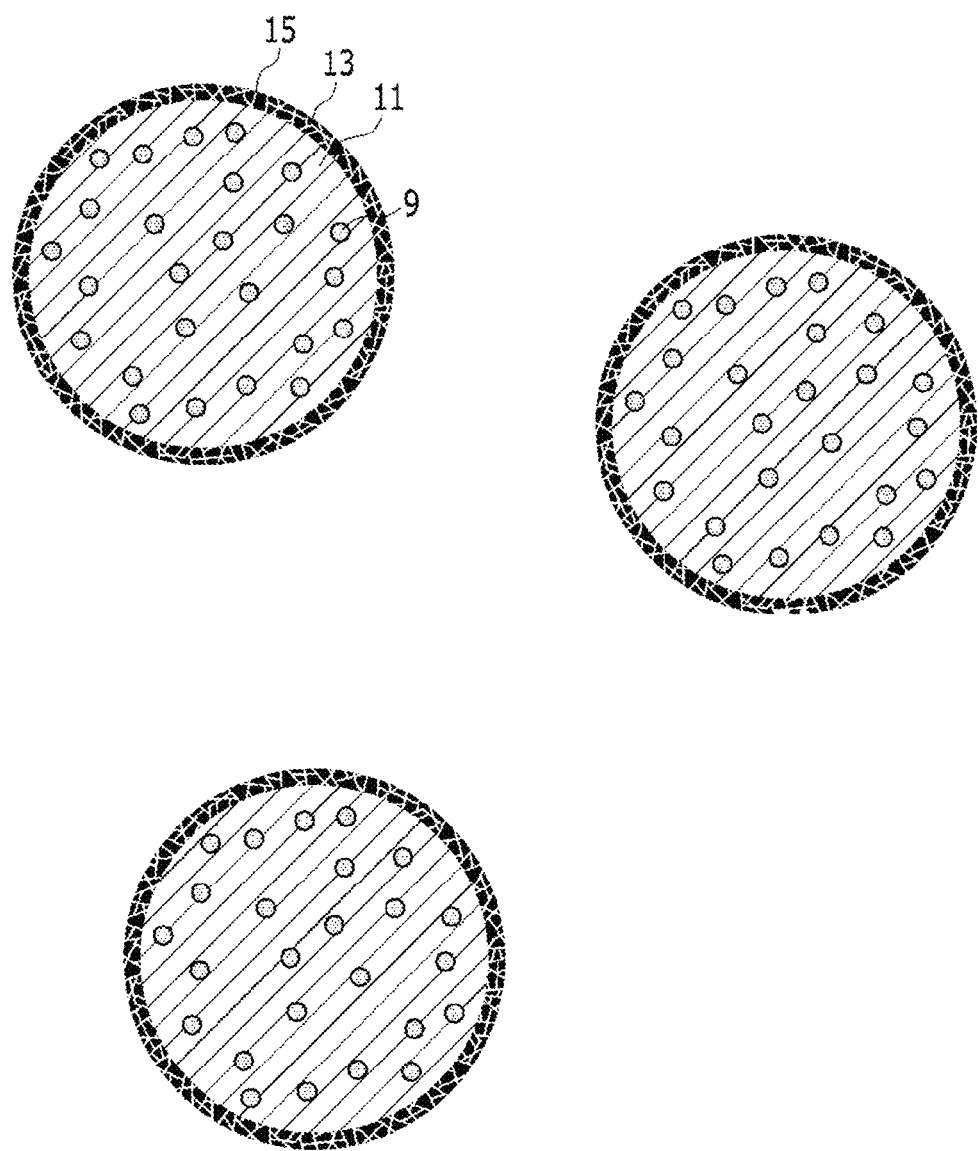

Referring to FIG. 2C, the metal suboxide precursor including a pore-forming agent and surrounded with a polymer may be heat-treated.

The heat treatment and its result are the same as described above unless there is a particular mention to the contrary.

The heat treatment transforms the metal suboxide precursor into a metal suboxide 11. The polymer may be decomposed and turned into carbon 13, for example, amorphous carbon.

Figure 2D:
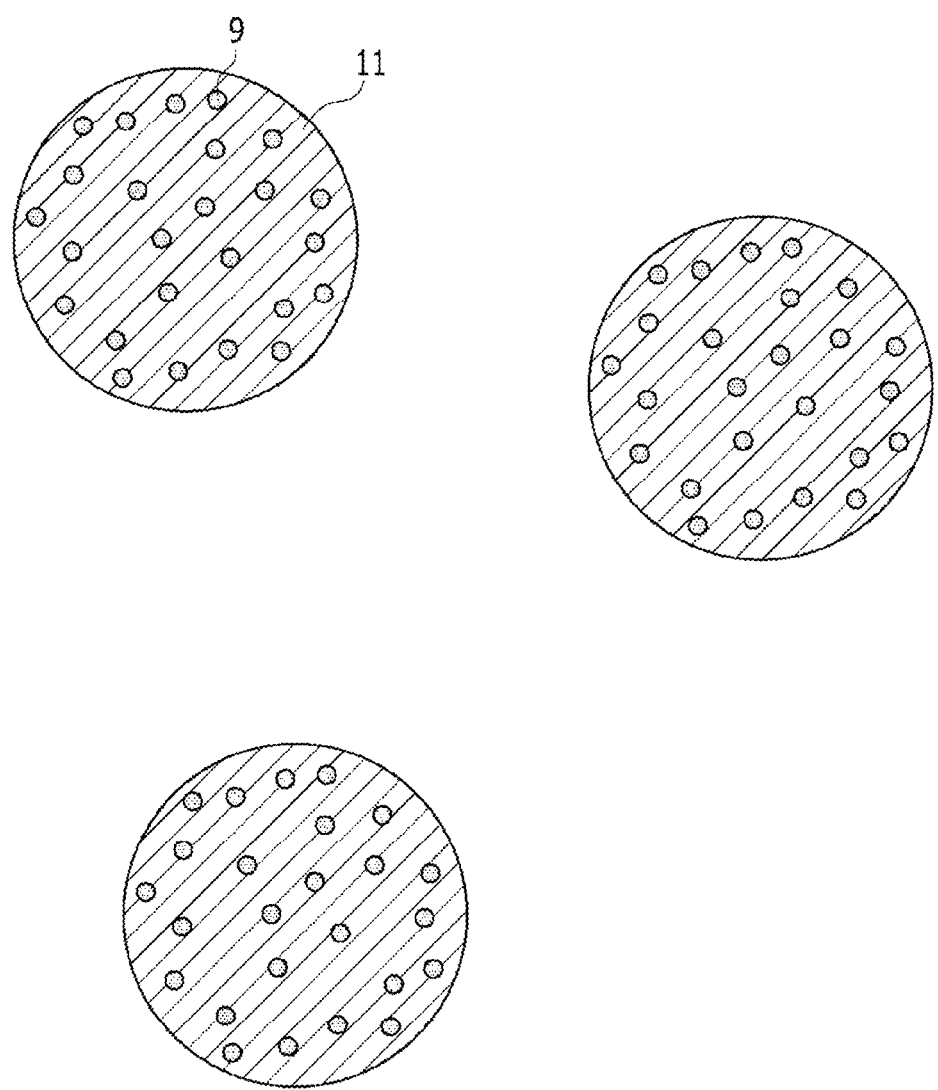

Referring to FIG. 2D, the carbon on the surface of a metal suboxide 11 is removed, preparing the metal suboxide 11 including a pore-forming agent 9.

The carbon removal is the same as described above unless there is a particular mention to the contrary.

Figure 2E:
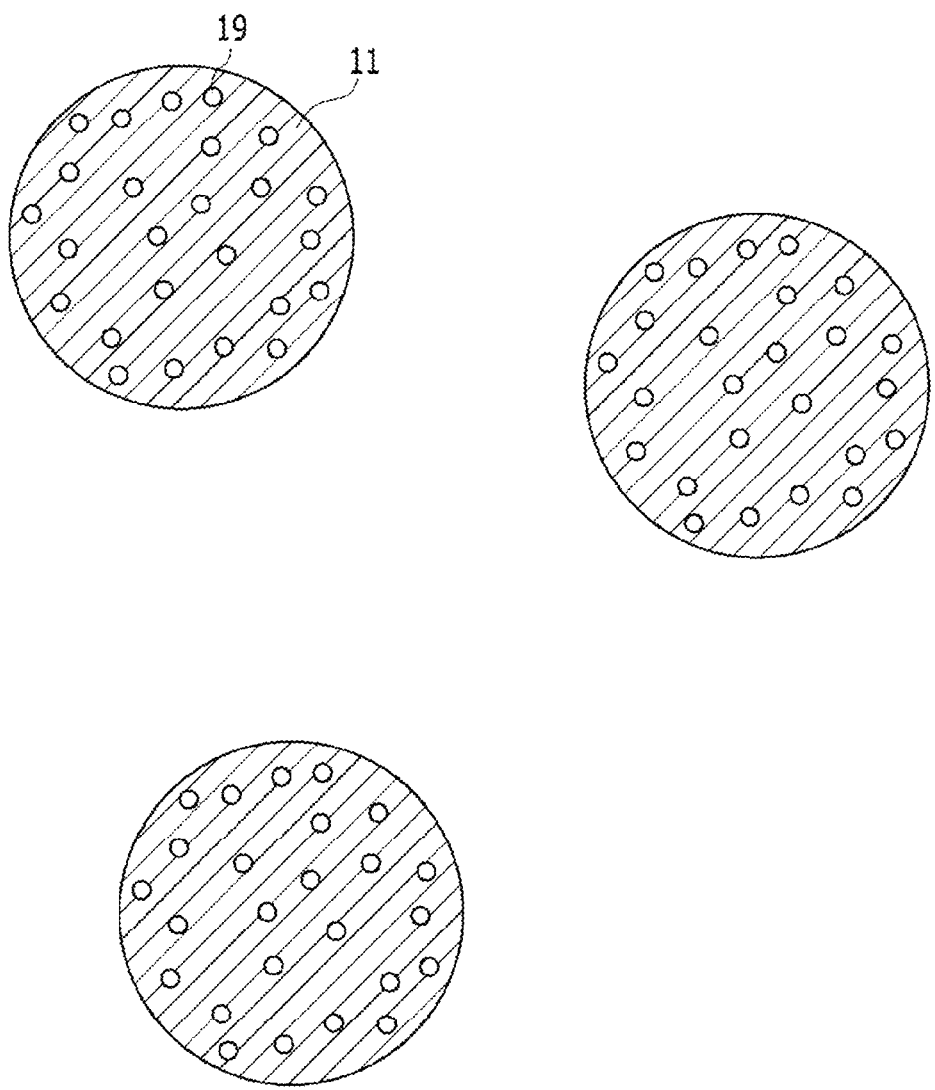

Referring to FIG. 2E, the pore-forming agent 9 inside the metal suboxide 11 is removed, preparing a metal suboxide 11 including a pore 19. Accordingly, the metal suboxide 11 may have a larger specific surface area.

For example, the metal suboxide 11 is treated with a sodium hydroxide (NaOH) solution to remove the pore-forming agent 9. However, the pore-forming agent removal is not limited thereto, and may be performed in various methods.

According to another example embodiment, a method of preparing a metal suboxide includes preparing a metal suboxide precursor and heat-treating the metal suboxide precursor.

The metal suboxide precursor may be prepared as a solution by using a solvent. However, the metal suboxide precursor is not limited thereto, and may not include a solvent.

Hereinafter, a metal, a metal suboxide precursor, a solvent, and a heat treatment are the same as described above unless there is a particular mention to the contrary.

The metal suboxide precursor may include one selected from a metal sulfate, a metal halide, a metal alkoxide (e.g., a metal isopropoxide, a metal butoxide, and the like), and a combination thereof, and in particular, a metal sulfate.

For example, the metal sulfate may be titanium sulfate, specifically one selected from $Ti(SO_4)_2$, $Ti_2(SO_4)_3$, $Ti_2(SO_2)_3$, and a combination thereof, but is not limited thereto.

In one example embodiment, the heat treatment may be performed under an argon (Ar) atmosphere at a temperature ranging from about 900° C. to about 1500° C. for about 1 hour to about 6 hours, and then under a hydrogen ($H_2$) atmosphere at a temperature ranging from about 900° C. to about 1500° C. for about 1 hour to about 6 hours. The heat treatment may be controlled regarding temperature and time to adjust composition and lattice properties of a metal suboxide.

According to the example embodiment, a method of preparing a metal suboxide may include one heat treatment process or heat treatment without changing a temperature. Accordingly, the heat treatment may be simplified to improve processibility and economy. In addition, the heat treatment may be controlled regarding temperature, time, and gas diffusion pathway, effectively preparing a metal suboxide having a desired composition and desired lattice properties.

EXAMPLES

Hereinafter, this disclosure is illustrated in more detail with reference to examples. However, they are example embodiments and are not limiting.

A specimen used in the following examples is as follows.
$Ti_2(SO_4)_3$ solution: 45 wt % in dilute sulfuric acid, 99.9+%, Sigma-Aldrich Co. Ltd.
Resorcinol: ACS reagent, >99%, Sigma-Aldrich Co. Ltd.
Formaldehyde: ACS reagent, 37 wt % in water, Sigma-Aldrich Co. Ltd.
NaOCl solution: Reagent grade, available chlorine 10-15%, Sigma-Aldrich Co. Ltd.
Colloid silica: colloidal silica, Ludox AS-30, 30 wt % suspension in water, Sigma-Aldrich Co. Ltd.
NaOH solution: ACS reagent, >97%, Sigma-Aldrich Co. Ltd.

Example 1

Preparation of Metal Suboxide ($Ti_4O_7$)

About 2.5 mL of a $Ti_2(SO_4)_3$ solution, about 0.3 g of resorcinol, about 0.45 mL of formaldehyde, and about 125 mL of water are put in a beaker and refluxed for a reaction at about 85° C. for about 24 hours.

Next, the reactant is filtered and dried at about 80° C. for 24 hours.

The resulting reactant is heat-treated under an argon (Ar) atmosphere at about 1100° C. for about 1 hour and under a hydrogen ($H_2$) atmosphere at about 1100° C. for about 4 hours.

The heat-treated reactant is added to about 250 mL of a NaOCl solution, and the mixture is agitated at room temperature (about 25° C.) for about 24 hours.

The resulting reactant is filtered and then dried at about 40° C. for about 3 hours, preparing a metal suboxide $Ti_4O_7$.

Example 2

Preparation of Metal Suboxide ($Ti_3O_5$)

About 2.5 mL of a $Ti_2(SO_4)_3$ solution, about 0.3 g of resorcinol, about 0.45 mL of formaldehyde, about 105 mL of water, and about 20 mL of colloid silica are refluxed for reaction together at about 85° C. for 24 hours.

Then, the reactant is filtered and dried at about 80° C. for about 24 hours in an oven.

The resulting reactant is heat-treated under an argon (Ar) atmosphere at about 1100° C. for about 1 hour and under a hydrogen ($H_2$) atmosphere at about 1100° C. for about 4 hours.

The heat-treated reactant is added to about 250 mL of a NaOCl solution, and the mixture is agitated at room temperature (about 25° C.) for about 24 hours.

Then, the reactant is filtered and dried at about 80° C. for about 24 hours in an oven.

The dried reactant is added to about 200 mL of a 3M NaOH solution, and the mixture is agitated at room temperature (about 25° C.) for about 3 hours.

The agitated reactant is filtered and dried at about 40° C. for about 3 hours, preparing a metal suboxide $Ti_3O_5$.

Example 3

Preparation of Metal Suboxide Mixture ($Ti_4O_7$+$Ti_3O_5$)

About 2.5 mL of a $Ti_2(SO_4)_3$ solution, about 0.3 g of resorcinol, about 0.45 mL of formaldehyde, about 105 mL of water, and about 20 mL of colloid silica are refluxed for reaction together at about 85° C. for about 24 hours.

Then, the reactant is filtered and dried at about 80° C. for about 24 hours in an oven.

The dried reactant is heat-treated under an argon (Ar) atmosphere at about 1000° C. for about 1 hour and under a hydrogen ($H_2$) atmosphere at about 1000° C. for about 4 hours.

The heat-treated reactant is added to about 250 mL of a NaOCl solution, and the mixture is agitated at room temperature (about 25° C.) for about 24 hours.

Then, the reactant is filtered and dried at about 80° C. for about 24 hours in an oven.

The dried reactant is added to about 200 mL of a 3 M NaOH solution, and the mixture is agitated at room temperature (about 25° C.) for about 3 hours.

Then, the reactant is filtered and dried at about 40° C. for about 3 hours, preparing a metal suboxide mixture $Ti_4O_7$+$Ti_3O_5$.

Example 4

Preparation of Metal Suboxide ($Ti_3O_5$)

About 2.5 mL of a $Ti_2(SO_4)_3$ solution and about 125 mL of water are refluxed for reaction at about 85° C. for about 24 hours.

Then, the reactant is filtered and dried at about 80° C. for about 24 hours.

The dried reactant is heat-treated under an argon (Ar) atmosphere at about 1100° C. for about 1 hour and under a hydrogen (H$_2$) atmosphere at about 1100° C. for about 4 hours.

In this way, a metal suboxide Ti$_3$O$_5$ is prepared.

Experimental Example 1

X-Ray Diffraction Analysis

The metal suboxides according to Examples 1 to 4 are analyzed regarding X-ray diffraction. The results are provided in FIG. 3.

Herein, a Cu-Kα ray as a light source is used in the X-ray diffraction analysis.

Figure 3:
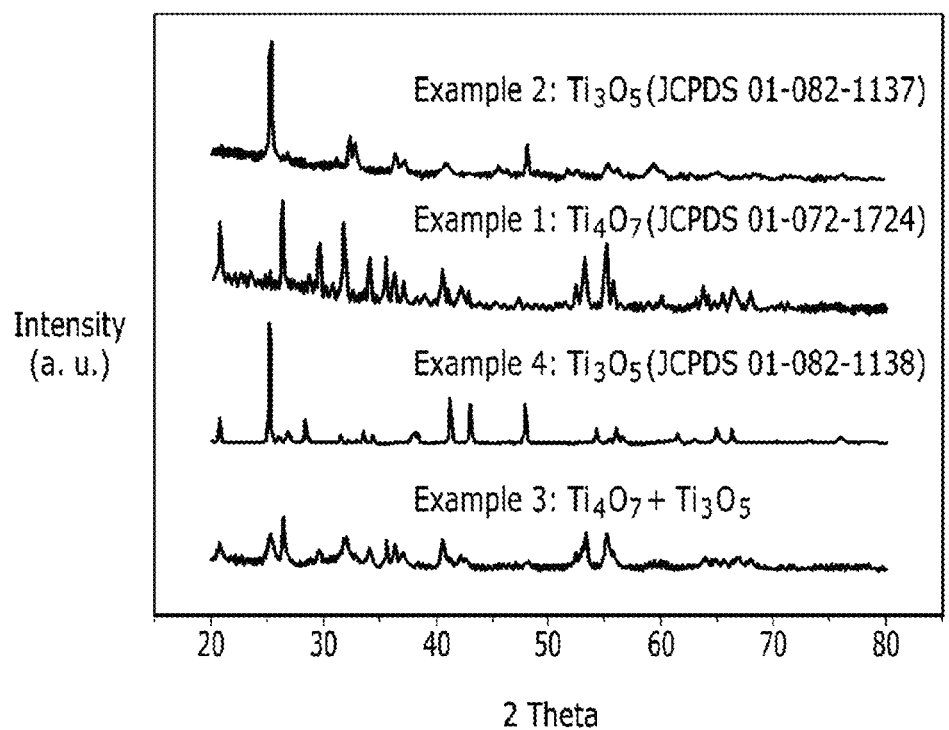

As shown in FIG. 3, Example 1 produces Ti$_4$O$_7$ corresponding to JCPDS 01-072-1724, Example 2 produces Ti$_3$O$_5$ corresponding to JCPDS 01-082-1137, Example 3 produces a Ti$_4$O$_7$ and Ti$_3$O$_5$ mixture, and Example 4 produces Ti$_3$O$_5$ corresponding to JCPDS 01-082-1138.

Therefore, the examples show that a metal suboxide having a desired composition and a desired lattice is selectively prepared by adjusting the diffusion pathway for gas and temperature for heat treatment.

Experimental Example 2

Scanning Electron Microscope (SEM) Image

The metal suboxides according to Examples 1 to 4 are respectively deposited on a carbon-coated tape, preparing a specimen. The specimen is photographed with a SEM. Herein, a field emission gun scanning electron microscope (FEG-SEM) JSM-6390 (JEOL Ltd.) is used.

Figure 4:
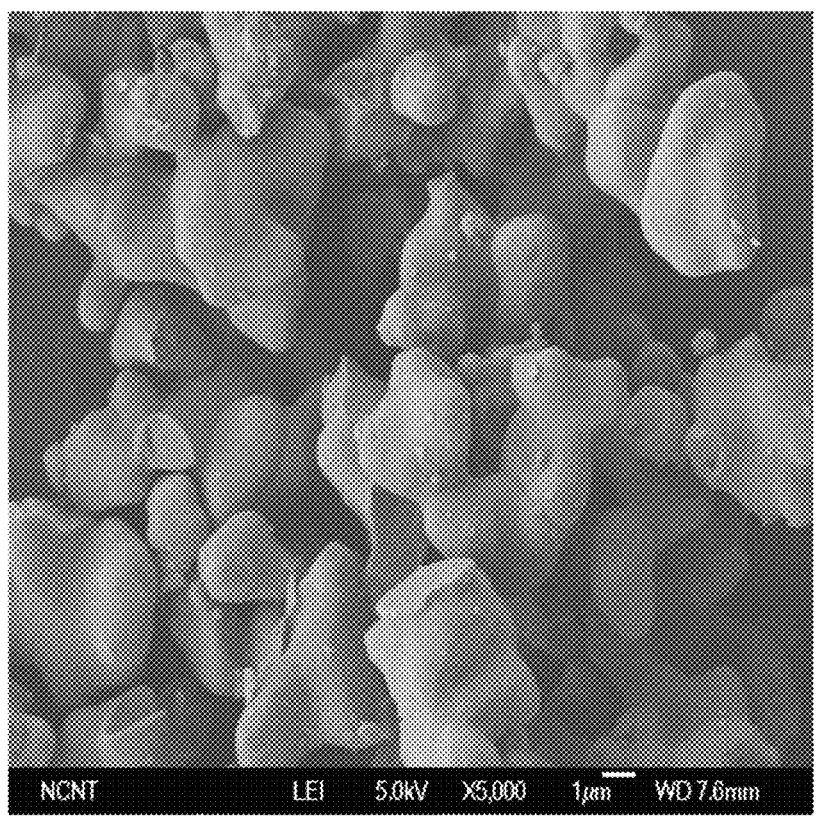
Figure 5:
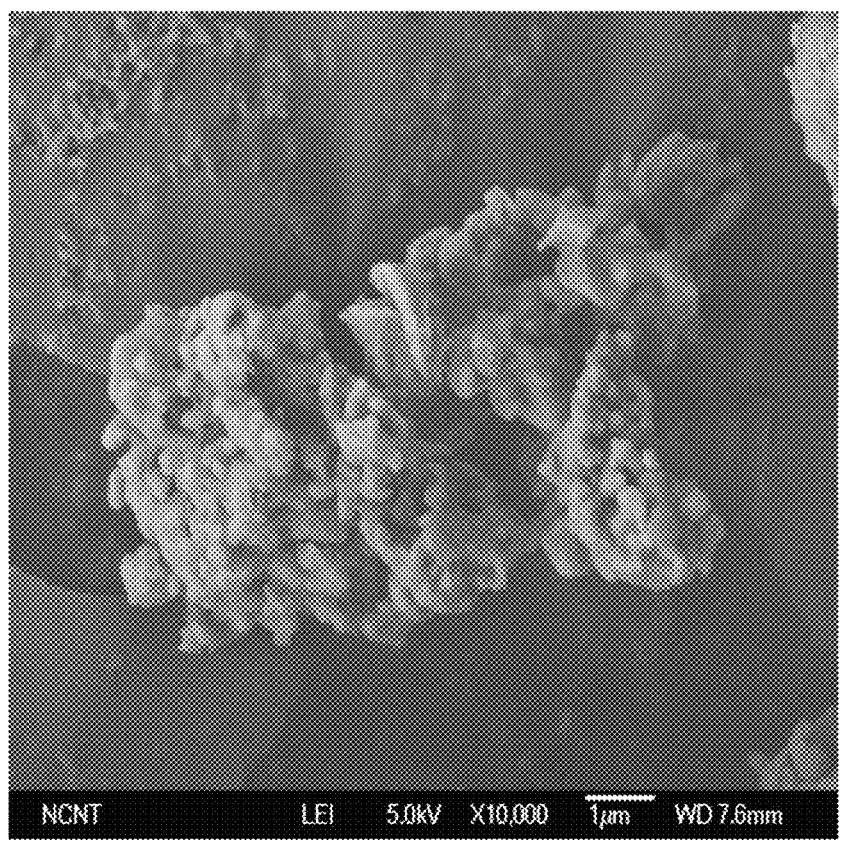
Figure 6:
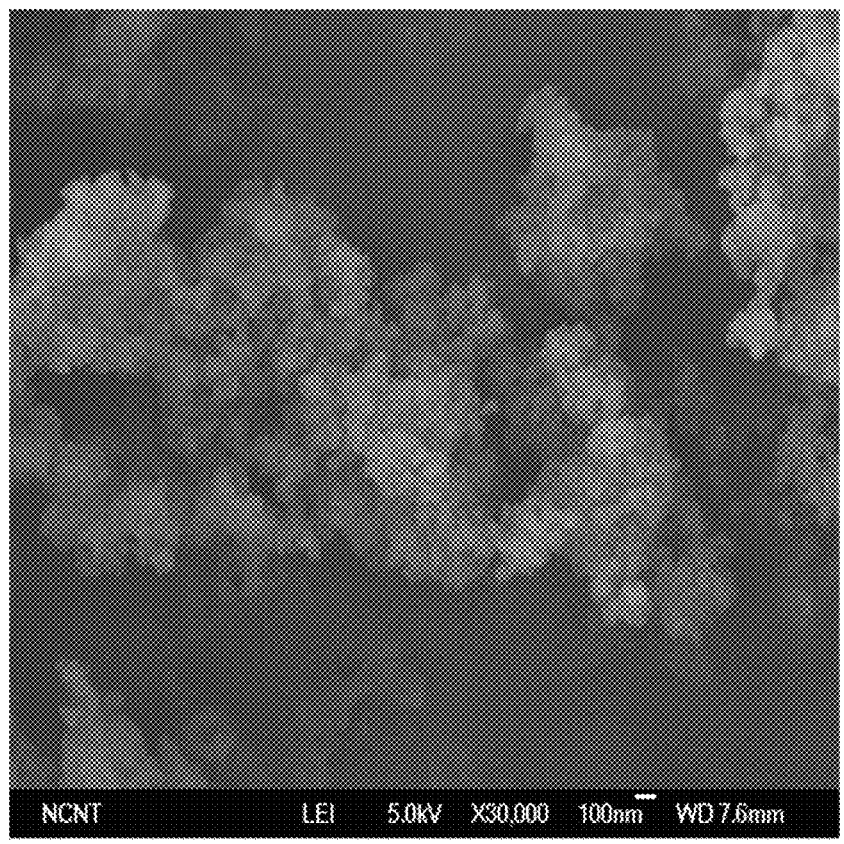
Figure 7:
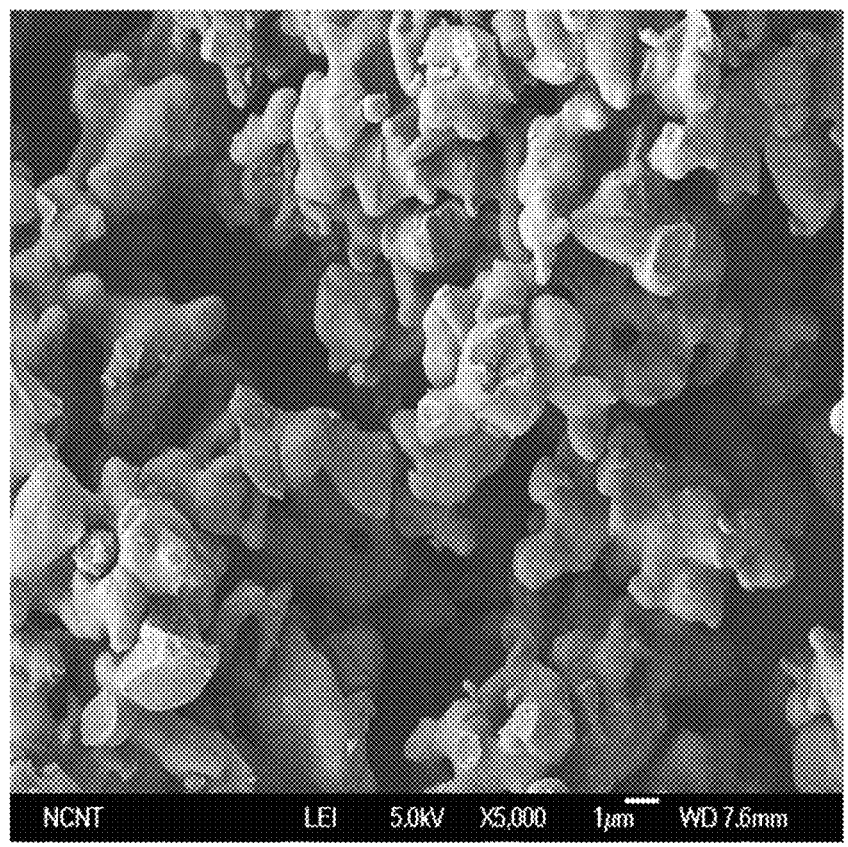

FIG. 4 shows a SEM photograph of the metal suboxide according to Example 1, FIG. 5 shows a SEM photograph of the metal suboxide according to Example 2, FIG. 6 shows a SEM photograph of the metal suboxide according to Example 3, and FIG. 7 shows a SEM photograph of the metal suboxide according to Example 4.

Referring to FIGS. 4 to 7, Example 1 forms a metal suboxide having a particle diameter ranging from about 1 μm to about 3 μm, Example 2 forms a metal suboxide having a particle diameter ranging from about 100 nm to about 1 μm and a spherical shape, Example 3 forms a metal suboxide having a particle diameter ranging from about 50 nm to about 100 nm, and Example 4 forms a metal suboxide having a particle diameter ranging from about 1 μm to about 3 μm.

Experimental Example 3

High Resolution Transmission Electron Microscope (HRTEM) Image

The metal suboxides according to Examples 1 to 4 are respectively ground in an ultrasonic wave grinder for about 10 minutes and deposited on a carbon-coated copper grid, preparing a specimen. The specimen is photographed with an HRTEM. Herein, a field-emission transmission electron microscope (FE-TEM) 2010F (JEOL Ltd.) operated at 200 kV is used.

Figure 8:
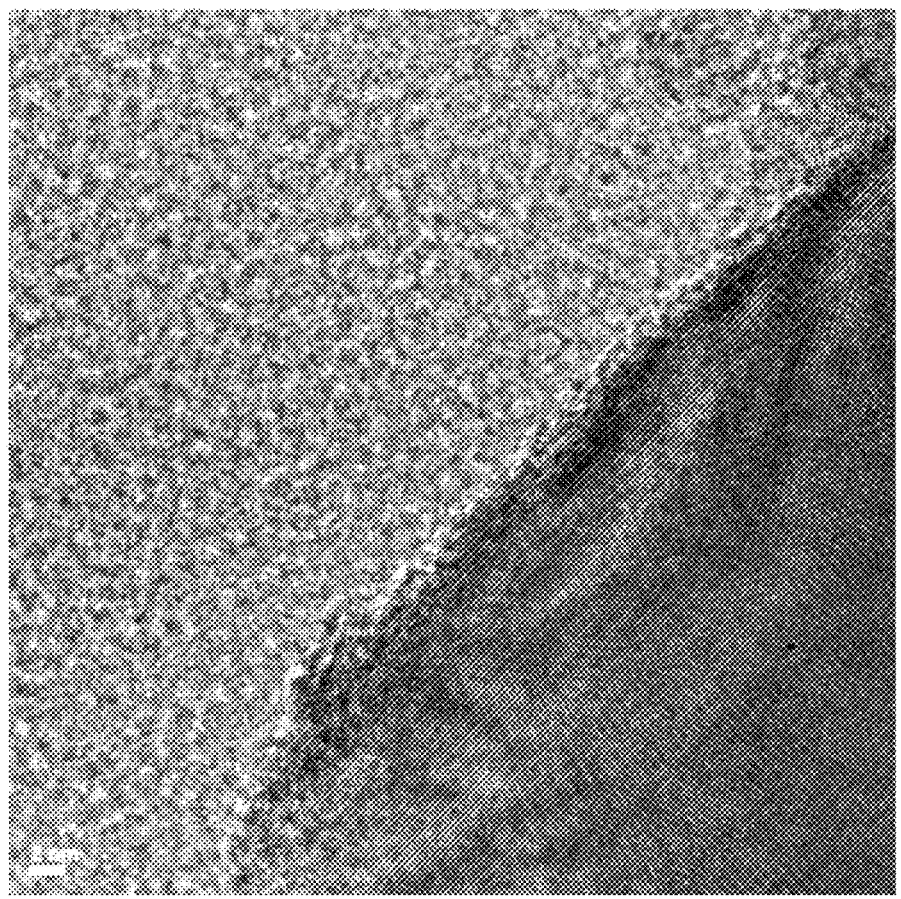
Figure 9:
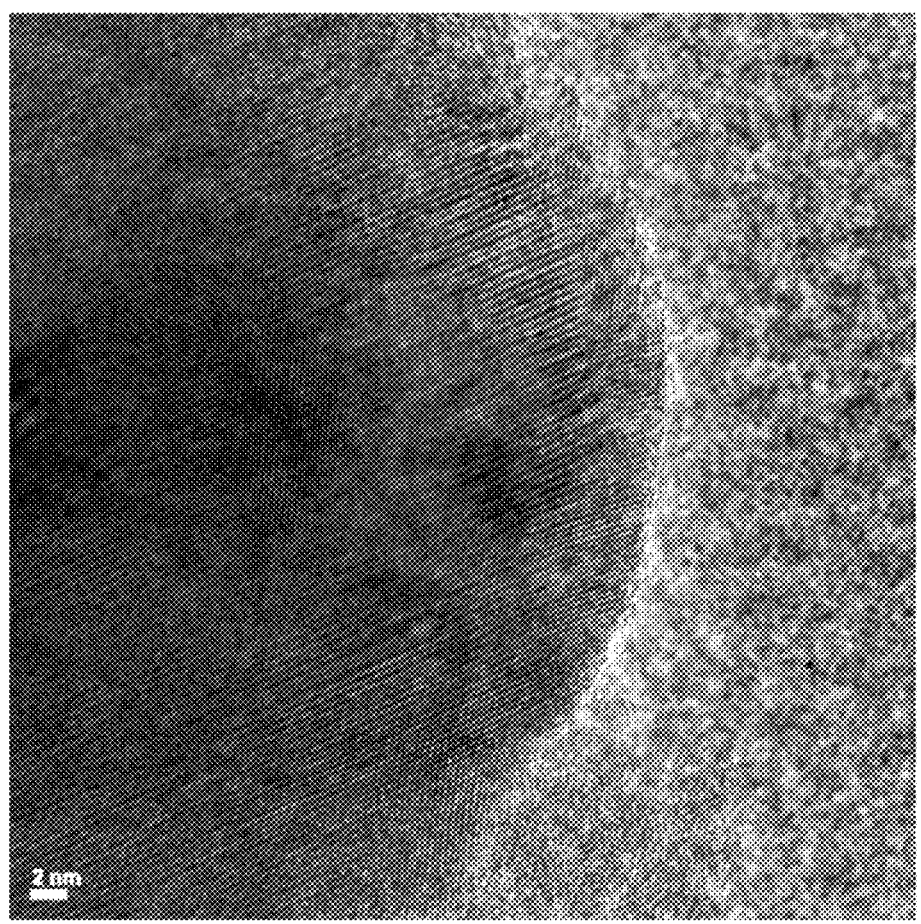
Figure 10:
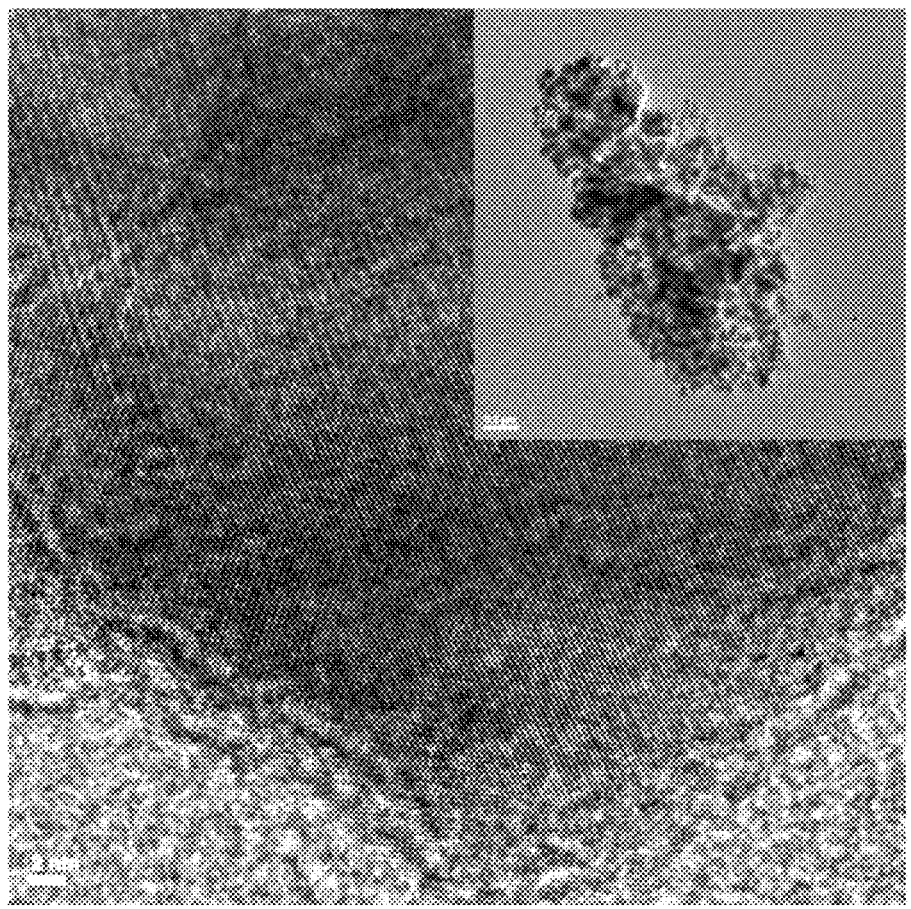
Figure 11:
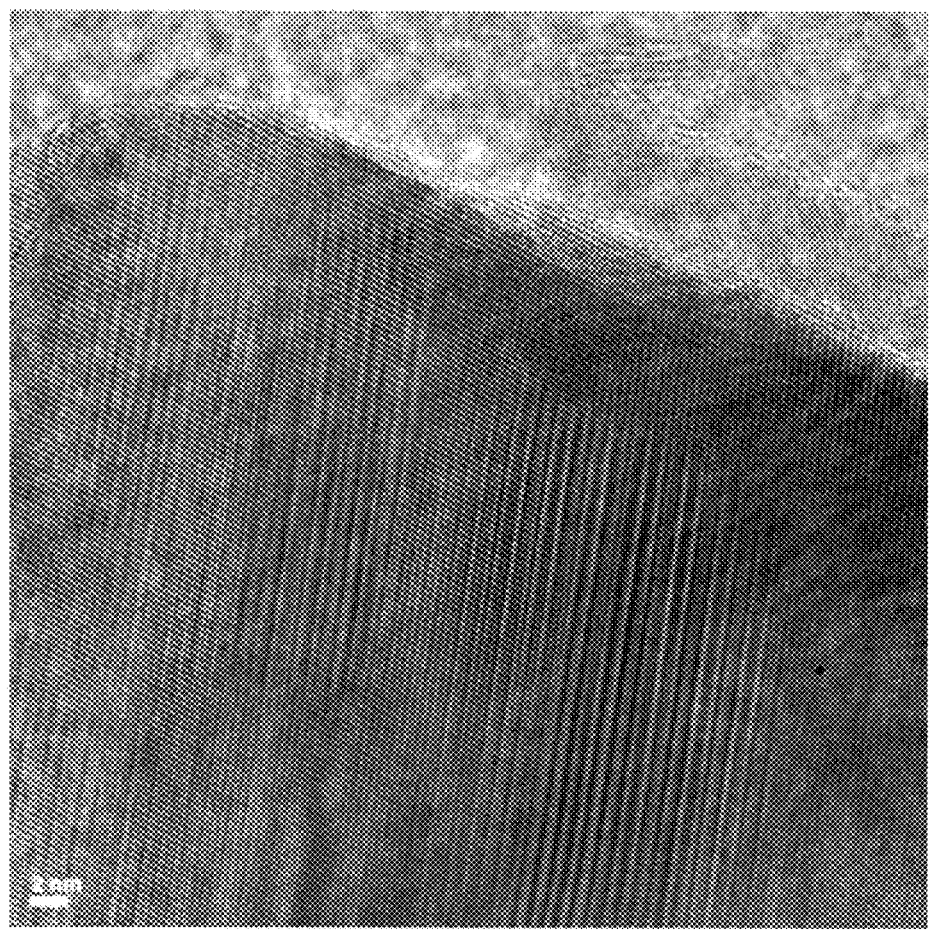

FIG. 8 is an HRTEM photograph of the metal suboxide according to Example 1, FIG. 9 is an HRTEM photograph of the metal suboxide according to Example 2, FIG. 10 is an HRTEM photograph of the metal suboxide according to Example 3, and FIG. 11 is an HRTEM photograph of the metal suboxide according to Example 4.

Referring to FIGS. 8 to 11, the metal suboxides according to Examples 1, 2, 3, and 4 turn out to have high crystallinity.

Experimental Example 4

Specific Surface Area Measurement

The metal suboxides according to Examples 1 to 4 are measured regarding specific surface area in a BET method using a measuring device (AS1-A4).

The results are provided in the following Table 1.

TABLE 1

|  | Specific surface area (m$^2$/g) |
| --- | --- |
| Example 1 | 2.7 |
| Example 2 | 10.8 |
| Example 3 | 44.6 |
| Example 4 | 1.7 |

As shown in Table 1, the metal suboxide according to Example 1 turns out to have a large specific surface area due to a phenol-formaldehyde-based polymer preventing, or suppressing, sintering of the metal suboxide.

The metal suboxide according to Example 2 includes a pore formed using a pore-forming agent, and thus has a larger specific surface area than the metal suboxide according to Example 1.

The metal suboxide according to Example 3 is heat-treated at a lower temperature than Example 2 to further prevent or suppress the sintering of the metal suboxide, and thus has a larger specific surface area than the one according to Example 2.

Accordingly, the specific surface area of a metal suboxide may be regulated by controlling materials and process conditions.

In addition, the metal suboxide according to Example 4 has a large specific surface area, and thus may form a metal suboxide having a large specific surface area with heat treatment at the same temperature.

Experimental Example 5

Element Analysis

The metal suboxides according to Examples 1 to 4 are performed regarding element analysis using Vario EL III equipment (Analysensystem GMBH).

The results are provided in the following Table 2.

TABLE 2

|  | Carbon (wt %) | Hydrogen (wt %) | Nitrogen (wt %) |
| --- | --- | --- | --- |
| Example 1 | 0.22 | 0.07 | 0.06 |
| Example 2 | 0.20 | 0.09 | 0.03 |
| Example 3 | 0.88 | 0.36 | 0.08 |
| Example 4 | 0.22 | 0.10 | 0.07 |

As shown in Table 2, the metal suboxides according to Examples 1 to 4 are identified to include less than or equal to 0.9 wt % of carbon. Accordingly, the metal suboxides according to Examples 1 to 4 have a large specific surface area without carbon.

While this disclosure has been described in connection with what is presently considered to be practical example embodiments, it is to be understood that the invention is not limited to the disclosed example embodiments, but, on the contrary, is intended to cover various modifications and equivalent arrangements included within the spirit and scope of the appended claims.

What is claimed is:

1. A metal suboxide having a specific surface area of greater than or equal to about 1.5 m2/g, and all metal in the metal suboxide has an oxidation number of about +3 to about +3.8.

2. The metal suboxide of claim 1, wherein the specific surface area of the metal suboxide ranges from about 1.5 m2/g to about 50 m2/g.

3. The metal suboxide of claim 1, wherein the metal suboxide comprises carbon in an amount of less than or equal to about 1 wt % based on a total weight of the metal suboxide.

4. The metal suboxide of claim 1, wherein the metal suboxide comprises one metal selected from a transition metal, a post-transition metal, and a combination thereof.

5. The metal suboxide of claim 1, wherein the metal suboxide comprises one metal selected from titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), aluminum (Al), gallium (Ga), indium (In), thallium (Tl), and a combination thereof.

6. The metal suboxide of claim 5, wherein, the metal suboxide is a titanium suboxide.

7. The metal suboxide of claim 1, wherein the metal suboxide has a pore.

8. A catalyst, comprising:
the metal suboxide according to claim 1.

9. An electrochemical device, comprising:
the metal oxide according to claim 1.

10. The metal suboxide of claim 1, wherein the metal suboxide is a titanium suboxide represented by Chemical Formula 1:

$$Ti_nO_{2n-1} \quad \text{[Chemical Formula 1]}$$

In Chemical Formula 1, n is an integer ranging from 3 to 12.

11. The metal suboxide of claim 10, wherein n is an integer ranging from 3 to 4.

12. The metal suboxide of claim 1, wherein the metal suboxide has a pore having an average diameter of about 0.5 nm to about 100 nm.

* * * * *

UNITED STATES PATENT AND TRADEMARK OFFICE
CERTIFICATE OF CORRECTION

PATENT NO. : 9,643,158 B2
APPLICATION NO. : 14/573412
DATED : May 9, 2017
INVENTOR(S) : Dong Jin Ham et al.

Page 1 of 1

It is certified that error appears in the above-identified patent and that said Letters Patent is hereby corrected as shown below:

On the Title Page

(73) ASSIGNEES, please correct, as follows:
1) SAMSUNG ELECTRONICS CO., LTD., GYEONGGI-DO (KR); and
2) POSTECH ACADEMY-INDUSTRY FOUNDATION, Kyungsangbuk-Do (KR)

Signed and Sealed this
Twenty-fourth Day of July, 2018

Andrei Iancu
*Director of the United States Patent and Trademark Office*